No. 628,382. Patented July 4, 1899.
O. P. BARNETT.
MOLD FOR CEMENT OR CONCRETE WORK.
(Application filed Feb. 28, 1899.)

(No Model.) 2 Sheets—Sheet 1.

WITNESSES:
M. D. Blondel
Amos W. Hart

INVENTOR
Oliver P. Barnett.
BY Munn & Co.
ATTORNEYS.

No. 628,382. Patented July 4, 1899.
O. P. BARNETT.
MOLD FOR CEMENT OR CONCRETE WORK.
(Application filed Feb. 28, 1899.)
(No Model.) 2 Sheets—Sheet 2.
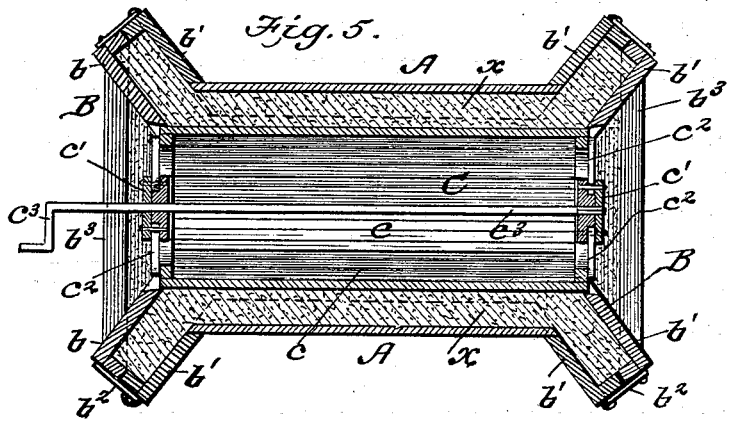
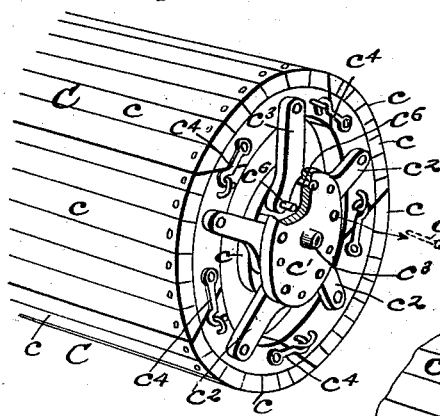
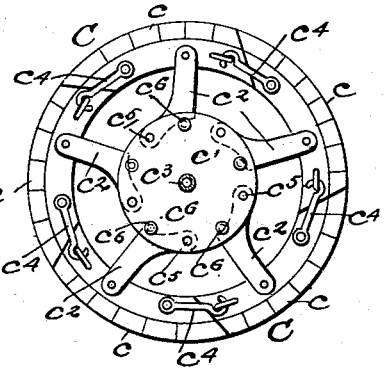
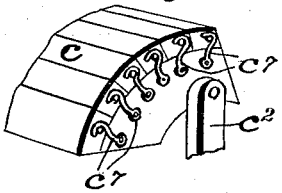
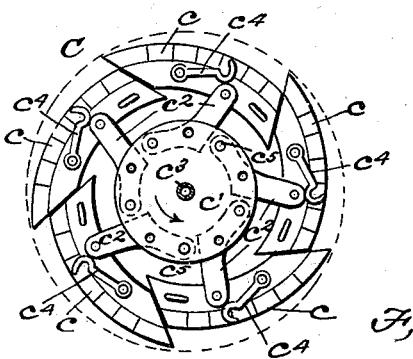
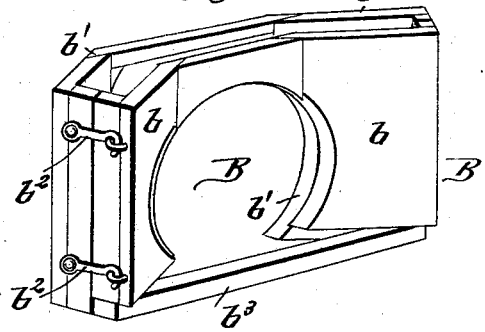
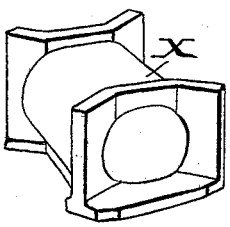
WITNESSES:
M. S. Blondell
Amos W. Hart
INVENTOR
Oliver P. Barnett.
BY Munn & Co.
ATTORNEYS.
THE NORRIS PETERS CO., PHOTO-LITHO., WASHINGTON, D. C.

UNITED STATES PATENT OFFICE.

OLIVER PERRY BARNETT, OF ALLERTON, IOWA.

MOLD FOR CEMENT OR CONCRETE WORK.

SPECIFICATION forming part of Letters Patent No. 628,382, dated July 4, 1899.

Application filed February 28, 1899. Serial No. 707,168. (No model.)

*To all whom it may concern:*

Be it known that I, OLIVER PERRY BARNETT, a citizen of the United States, residing at Allerton, in the county of Wayne and State of Iowa, have made certain new and useful Improvements in Molds for Cement or Concrete Work, of which the following is a full and exact description.

In the construction of small cement or concrete culverts, drains, and the like the chief difficulty has been to provide efficient means for supporting the core around which the material is molded and for removal of the same after the cement or concrete has hardened or set. I have provided an improved apparatus of which a collapsible core forms a distinguishing feature, and I have provided other separable parts forming the exterior or body of the mold, which are in practice suitably connected with each other and adapted to be removed after the core.

The details of construction, combination, and operation of parts are as hereinafter described, reference being had to the accompanying drawings, two sheets, in which—

Figure 1:
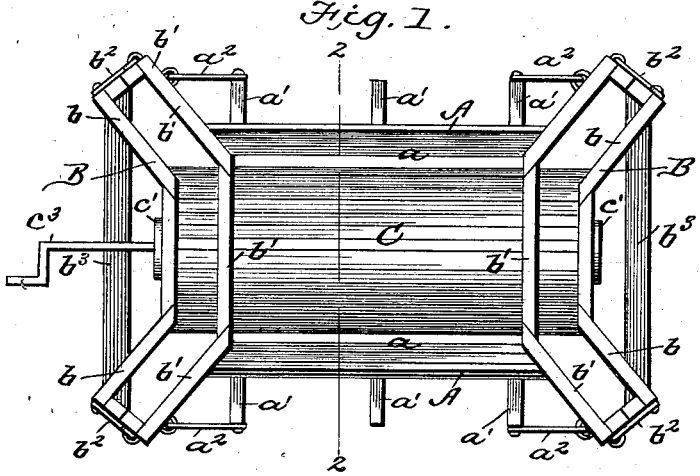
Figure 2:
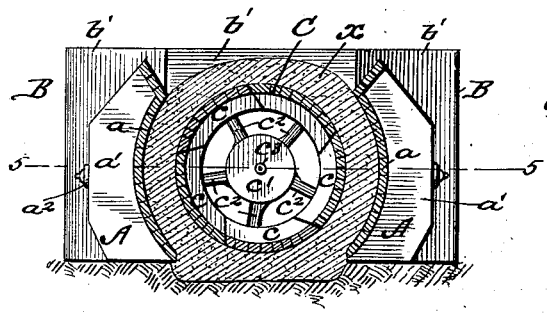
Figure 3:
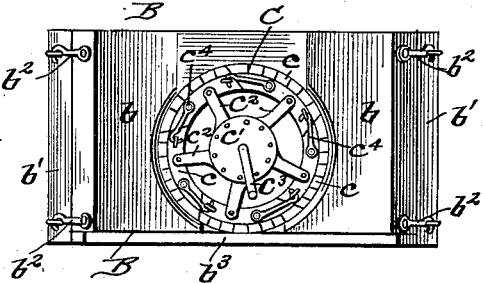
Figure 4:
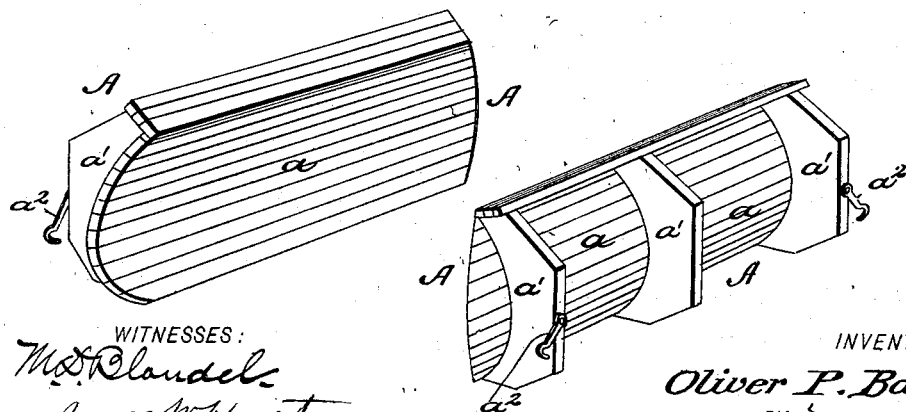

Figure 1 is a top plan view of my entire mold or mold apparatus. Fig. 2 is a transverse vertical section on the line 2 2 of Fig. 1, the apparatus being shown filled with concrete or cement, as required, to form a culvert or drain. Fig. 3 is an end view of the mold. Fig. 4 is a perspective view of the two sides of the mold. Fig. 5, Sheet 2, is a horizontal section on the line 5 5 of Fig. 2. Fig. 6 is a perspective view of one end of the core. Fig. 6$^a$ is a perspective view of the end of one of the core-sections. Fig. 7 is a perspective view of one of the angular connecting-bars employed for expanding and collapsing the core-sections. Fig. 8 is an end view of the core expanded. Fig. 9 is an end view of the core collapsed. Fig. 10 is a perspective view of one of the hollow heads of the mold. Fig. 11 is a perspective view of a cement or concrete culvert or drain produced by my improved mold.

The chief or principal parts of the mold or mold apparatus are the two arc-shaped sides A forming the body, the hollow heads or end portions B, and the central cylindrical and collapsible core C. As shown in Fig. 4, each of the sides or body portions A is composed of boards arranged longitudinally parallel and attached to the concave sides of ribs $a'$, which are arranged vertically, as shown. Thus the said sides A are arc-shaped, as required, to form the sides of a cylindrical culvert or drain. (See Fig. 2.) The tops of the said sides A are flared outwardly to facilitate the application of cement or concrete on the upper side of the core.

The hollow heads or end portions B are constructed with a circular opening (see Fig. 10) on the inner side $b'$, which adapts them to fit upon or receive the ends of the body portion A, as shown in Fig. 5, while the outer portions $b$ are adapted to the smaller circle described by the core C. The two parts $b$ and $b'$ are separated from each other by a space adapted to receive cement or concrete and are adapted for detachment or separation by means of pivoted hooks $b^2$. (See Fig. 10.) The projecting sides or ends of said heads B have an obtuse angle to the central or intermediate portion, as shown best in Fig. 1, for the purpose of giving the completed culvert or drain X the flaring form shown in Fig. 11.

The outer portions $b$ of the heads B are connected by a bar $b^3$, which not only serves to brace the same, but also as a marginal line or limit for the cement or concrete in the process of constructing the culvert or drain. The said heads B are detachably connected with the sides A by means of hooks $a^2$ or other suitable devices.

The cylindrical core C is formed of a series of segmental sections $c$, (see Figs. 6, 8, and 9,) which are operatively connected by angular bars $c^2$ with disks $c'$, that are keyed upon a central shaft $c^3$. The said shaft, disks, and bars constitute the means by which the core is expanded and collapsed, as will be presently described. Each of the said bars $c^2$ is pivoted to the end of a segment or section $c$ and at its opposite end to a disk $c'$. A detachable pin $c^6$, there being one for each bar $c^2$, as shown in Fig. 6, is inserted through the disk $c'$ when it is required to hold the core expanded, as shown in Figs. 6 and 8—that is to say, when the core is expanded, which is effected by rotating the crank-shaft $c^3$ and its attached disks $c'$, the angles of the bars $c^2$ are near the periphery of the disks, as shown by dotted lines, Fig. 8, and the pins $c^6$ are inserted directly behind the shoulders or angles of the bars, and thus hold the latter fixed in position relative to the segments $c$ and the disks, as will be readily understood. On the other hand, when the said pins $c^6$ are withdrawn and the crank-shaft $c^3$ is rotated to the left, the angles of the bars $c^2$ will be drawn within the circle or periphery of the disks $c'$, as shown in Fig. 9, and the segment $c$ thereby drawn within the circle described by the expanded core. Thus by rotation of the crank-shaft $c^3$ in one direction or the other the core C may be quickly and easily expanded or collapsed, as may be required, and by insertion of the pins $c^6$ the core may be locked in the expanded position. The several segments $c$ composing the body of the core are detachably locked or connected when in the expanded position by means of hooks $c^4$. In Fig. 6 the boards or planks forming the periphery of the core C are shown nailed to the arc-shaped ribs; but this is not my preferred construction, which is represented in Fig. $6^a$, where hooks $c^7$ are shown connecting the longitudinal boards or planks with the arc-shaped ribs. Thus when the core has been collapsed for the purpose of withdrawing it from a completed culvert or drain the covering boards or planks may be detached and withdrawn separately. This construction is therefore of importance in facilitating removal of the core, although not always absolutely necessary.

In the practical use of my improved mold I proceed as follows—that is to say, in constructing culverts, drains, or sewers when the excavation has been suitably made cement is spread on the bottom of the same to the required thickness for the foundation of the culvert or drain and the core C is set thereon and the parts A are placed on each side of it at the proper distance to allow for the thickness of the culvert, &c. The ends or heads B are then set in place, as shown in Fig. 1. It is understood that the heads B are to be detachably connected with the said sides A by means of hooks $a^2$, as required for holding them rigidly in due position with relation to each other. Cement or concrete $x$, Figs. 2 and 5, is then poured in to fill the space between the core C and sides A and also to fill the hollow heads B. After the sides of the culvert or drain have been built up to the top of the sides A a quantity of cement or concrete is spread upon the core C to form the top of such culvert or drain, as shown in Fig. 2. The thickness of this portion will correspond to the strength the structure is required to have in practice, which depends mainly upon the depth at which said culvert or drain is located. When the cement or concrete has hardened sufficiently, the pins $c^6$ are withdrawn from the core-disks $c'$, and the crank-shaft $c^3$ is then rotated to collapse the core, as before described, it being understood that the hooks $c^4$ are swung back, as shown in Fig. 9, as a preliminary step in the operation. The core periphery may be removed by first releasing it from the segment-ribs by detaching the hooks $c^7$. The core having been removed, the outer portions $b$ of the heads B are next detached, and then the inner portions $b'$ of the same, after which the sides A are removed.

This mold may be applied to the construction of vertical structures, such as flues, and in such operation it is manifest that extra side sections or portions A will be required to fill the top and bottom spaces left vacant in the horizontal structures, as illustrated in Fig. 2.

While I have illustrated disks $c'$, Figs. 5 and 6, as constructed of two parts of equal diameter bolted or riveted together and provided with a peripheral groove to receive the bars $c^2$, I do not limit myself to such construction, but propose to employ any suitable means of connection between the shaft $c^3$ and the aforesaid bars which will allow reversal of position of the latter as required for expansion and contraction of the core. I may also employ any suitable locking device for the bars $c^2$.

It is obvious that the dimensions of the apparatus will be duly proportioned to the work to be done and that the sides A will be spaced from the core C according to the thickness desired for the culvert or drain in a particular case.

What I claim is—

1. A collapsible core for a mold apparatus, comprising peripheral sections, central disks, bars connecting said parts, and detachable pins adapted for insertion in the disks adjacent to said bars for locking the bars in position to hold the core expanded, substantially as shown and described.

2. A collapsible core for a mold apparatus comprising peripheral sections, a central rotatable shaft, disks keyed to the latter, angular bars connecting the said sections and disks and pivoted to each at their respective ends and a device applied to the disks in engagement with the angles of said bars, for the purpose of holding them in the position required for expansion of the core, substantially as shown and described.

3. An improved mold apparatus, comprising separable semicircular sides and heads, which are adapted to fit upon said sides, and are constructed of two separable parts which are connected by suitable devices when in use, and spaced apart as specified, to form a chamber adapted to receive cement, as shown and described.

4. An improved mold apparatus, substantially as described, the same being composed of two arc-shaped longitudinal portions or sides, hollow heads adapted to receive or fit upon the said sides, and means for detachably connecting the two parts and holding the sides separated at the required distance from each other, and a collapsible, cylindrical core adapted to fit loosely within the outer portion of said heads, substantially as shown and described.

OLIVER PERRY BARNETT.

Witnesses:
G. A. ANDERSON,
SHERMAN BETTIS.